(12) United States Patent
Borrel et al.

(10) Patent No.: US 11,100,469 B2
(45) Date of Patent: Aug. 24, 2021

(54) CROSS-DOMAIN COLLABORATIVE DATA LOG

(71) Applicant: International Business Machines Corporation, Armonk, NY (US)

(72) Inventors: Paul Borrel, Rio de Janeiro (BR); Alvaro B. Buoro, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 15/333,710

(22) Filed: Oct. 25, 2016

(65) Prior Publication Data

US 2018/0114190 A1   Apr. 26, 2018

(51) Int. Cl.
*G06Q 10/10* (2012.01)
*G06F 16/84* (2019.01)
*G06F 16/9038* (2019.01)
*G06N 20/00* (2019.01)

(52) U.S. Cl.
CPC .......... *G06Q 10/103* (2013.01); *G06F 16/84* (2019.01); *G06F 16/9038* (2019.01); *G06N 20/00* (2019.01)

(58) Field of Classification Search
CPC .... G06Q 10/103; G06F 16/84; G06F 16/9038
See application file for complete search history.

(56) References Cited

U.S. PATENT DOCUMENTS

| 8,660,973 | B1 | 2/2014 | Feigenbaum | |
|---|---|---|---|---|
| 9,092,741 | B1 | 7/2015 | Goparaju et al. | |
| 9,430,463 | B2 * | 8/2016 | Futrell | G06F 40/194 |
| 9,633,004 | B2 * | 4/2017 | Giuli | G10L 15/22 |
| 10,176,167 | B2 * | 1/2019 | Evermann | G06F 40/35 |
| 2010/0070448 | A1 * | 3/2010 | Omoigui | H01L 27/14647 706/47 |
| 2010/0235307 | A1 * | 9/2010 | Sweeney | G06F 16/367 706/12 |
| 2015/0112945 | A1 * | 4/2015 | Frankhauser | G06F 9/4843 707/654 |
| 2017/0185674 | A1 * | 6/2017 | Tonkin | G06F 16/328 |

FOREIGN PATENT DOCUMENTS

| CN | 101931978 A | 12/2010 | |
|---|---|---|---|
| WO | 2001022194 A2 | 3/2001 | |
| WO | 2006042142 A3 | 4/2006 | |
| WO | 2012092669 A1 | 7/2012 | |
| WO | WO-2013115985 A2 * | 8/2013 | ....... G06F 16/24522 |
| WO | 2015105494 A1 | 7/2015 | |

OTHER PUBLICATIONS

Choi, "A Survey on Ontology Mapping", 2006 (Year: 2006).*

* cited by examiner

*Primary Examiner* — Ann J Lo
*Assistant Examiner* — Van C Mang
(74) *Attorney, Agent, or Firm* — Jorge M. Maranto

(57) ABSTRACT

A system, method and program product for a computer-based project collaboration system using a data log for cross-domain collaboration. A cognitive log stores log entries based on domain-specific project data sources. An ontology translator includes domain-specific ontologies and a mapping ontology that defines relationships among the domain-specific ontologies. A cross-domain query includes domain parameters from one domain-specific ontology and returns and displays results based on log entries with domain parameters from another domain-specific ontology using the ontology translator.

14 Claims, 6 Drawing Sheets

200

| Entry Type 210 | Shared Data 212 | Context Domain 214 | Context Parameters 216 | Time Stamp 218 |
|---|---|---|---|---|
| Goals 220 | Structured | Source Domain | Domain Parameters | Time Logged |
| Steps 222 | Unstructured | Source Domain | Domain Parameters | Time Logged |
| Bibliography 224 | Structured | Source Domain | Domain Parameters | Time Logged |
| Analysis 226 | Unstructured | Source Domain | Domain Parameters | Time Logged |
| Reporting 228 | Structured | Source Domain | Domain Parameters | Time Logged |
| Queries 230 | Structured | Source Domain | Domain Parameters | Time Logged |
| Uncertainty 232 | Structured | Source Domain | Domain Parameters | Time Logged |

Figure 2

CROSS-DOMAIN COLLABORATIVE DATA LOG

TECHNICAL FIELD

The disclosure relates to project management environments, and more particularly to data management for computer-based project collaboration applications operating across knowledge domains.

BACKGROUND

Computers are used in most areas of complex data acquisition, expert analysis, and system implementation. This is particularly true in areas of deep domain knowledge, such as the analysis of complex physical systems. For example, the planning, implementation, and maintenance of oil reservoirs may include domain knowledge and related computer systems for analysis of seismic, well-logging, structural geology, reservoir geology, etc. Each of these domains and the computer systems they use may be based on the vernacular of a particular expert group and intended to facilitate productivity within that group. These vernaculars translate themselves into both the unstructured data and data structures of these systems. Differences in terminology and data formats may prevent expert users and cross-functional managers or organizations from effectively using data generated in other domains, even if those domains are part of a common project workflow.

Project management software exists for organizing complex projects, including the management of process steps, data repositories, milestones, team membership & tasks, approvals, and reporting. These project management functions have also been implemented in distributed, multi-user collaboration platforms that enable the use of data repositories, project workflows, and project-specific data across users operating in different domains. These systems generally rely on experts in each domain to provide selected information formatted for use by generalists or experts in other domains, such as specific report outputs or identified data parameters for use in other process steps. This may limit the depth and breadth of domain knowledge available to users in other domains, as well as to cross-domain managers and sponsors.

SUMMARY

Aspects of the disclosure provide a system, method and program product for a computer-based project collaboration system using a data log for cross-domain collaboration. A cognitive log stores log entries based on domain-specific project data sources. An ontology translator includes domain-specific ontologies and a mapping ontology that defines relationships among the domain-specific ontologies. A cross-domain query includes domain parameters from one domain-specific ontology and returns and displays results based on log entries with domain parameters from another domain-specific ontology using the ontology translator.

A first aspect discloses a project collaboration system that includes a cognitive log, an ontology translator, and a computer system. The cognitive log stores a plurality of log entries based on a plurality domain-specific project data sources. The ontology translator includes a plurality of domain-specific ontologies corresponding to the plurality of domain-specific project data sources and a mapping ontology that defines a plurality of relationships among the plurality of domain specific ontologies. The computer system is in communication with the cognitive log and ontology translator. It provides a cross-domain query function based on a first domain-specific ontology. A user query submitted through the computer system and including at least one first domain parameter from the first domain-specific ontology is translated into at least one equivalent but not identical second domain parameter from a second domain-specific ontology by the ontology translator. The computer system returns and outputs query results from the plurality of log entries in the cognitive log containing the second domain parameter.

A second aspect discloses a computer program product stored on a computer readable storage medium, which when executed by a computing system, provides a project collaboration system. Program code accesses a cognitive log that stores a plurality of log entries based on a plurality domain-specific project data sources. Program code accesses an ontology translator that includes a plurality of domain-specific ontologies corresponding to the plurality of domain-specific project data sources and a mapping ontology that defines a plurality of relationships among the plurality of domain specific ontologies. Program code provides a cross-domain query function based on a first domain-specific ontology. A user query submitted through the computer system and including at least one first domain parameter from the first domain-specific ontology is translated into at least one equivalent but not identical second domain parameter from a second domain-specific ontology by the ontology translator. Program code returns and displays query results on the computer system from the plurality of log entries in the cognitive log containing the second domain parameter.

A third aspect discloses a computerized method. A cognitive log is accessed that stores a plurality of log entries based on a plurality domain-specific project data sources. An ontology translator is accessed that comprises a plurality of domain-specific ontologies corresponding to the plurality of domain-specific project data sources and a mapping ontology that defines a plurality of relationships among the plurality of domain specific ontologies. A cross-domain query based on a first domain-specific ontology is received. The cross-domain query is a user query submitted through a computer system and includes at least one first domain parameter from the first domain-specific ontology, which is translated into at least one equivalent but not identical second domain parameter from a second domain-specific ontology by the ontology translator. The query results are returned and displayed on the computer system from the plurality of log entries in the cognitive log containing the second domain parameter.

BRIEF DESCRIPTION OF THE DRAWINGS

These and other features of this invention will be more readily understood from the following detailed description of the various aspects of the invention taken in conjunction with the accompanying drawings in which:

FIG. 2 shows an example cognitive log data structure according to embodiments.

Figure 1:
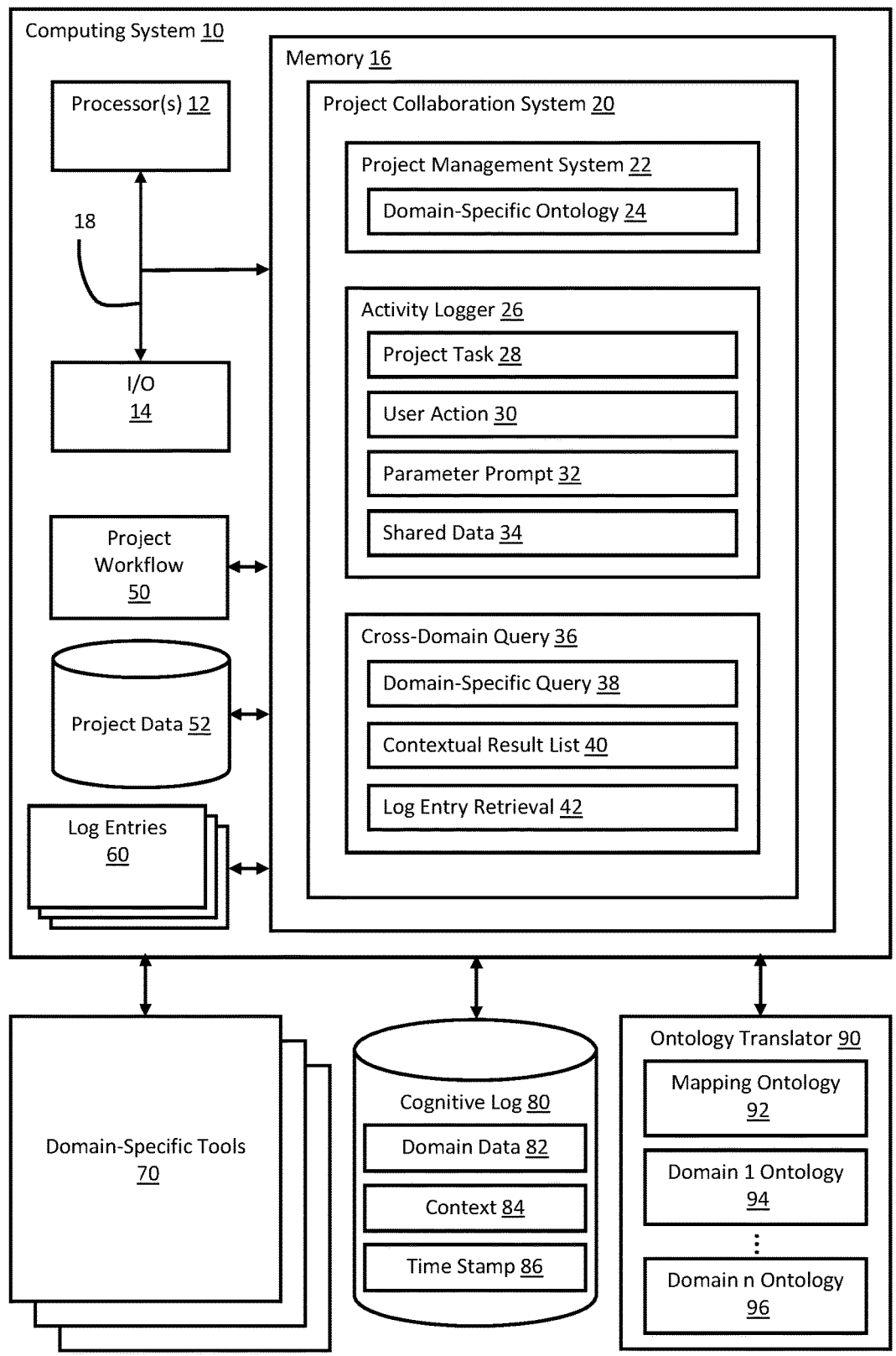
FIG. 1 shows an example project collaboration system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a computing system 10 having a project collaboration system 20 in communication with a cognitive log 80 and an ontology translator 90. Computer system 10 may be the computer system of one or more domain experts who use computer system 10 to gather, manage, analyze, and report on domain-specific activities that are part of a larger cross-domain project. For the purposes of this disclosure, a domain is a distinct area of human endeavor with distinct workflows, data pipelines, data parameters, and terminology. For example, in the analysis of a physical system there may be a plurality of users from different domains required to provide a complete analysis of the selected physical system. If a project was defined to analyze oil reservoirs, it could require domain experts from various domains, such as seismic, well-logging, structural geology, reservoir geology, etc. experts. Each of these domains may have distinct work flows, data pipelines, data parameters, and terminology for completing their contribution to the overall project workflow. For example, the expert users of computer system 10 may access domain-specific tools 70 for gathering and analyzing data to be stored in domain-specific project data 52. These expert users may operate according to a series of activities represented by a domain-specific project workflow 50. Both the domain-specific project workflow 50 and project data 52 may include data parameters and terminology that are distinct to that domain and may represent a domain-specific ontology, an ontology with data parameters and/or terminology that is not fully understood by experts in other domains. In some embodiments, the expert users may use a project management system 22 for managing resources, workflows, and data related to domain-specific project workflow 50 and project data 52. For example, project management system 22 may include activity scheduling, dependency, and data parameters. In some embodiments, project management system 22 may incorporate or embody a domain-specific ontology 24 describing the domain-specific parameters and their relationships with domain-specific project workflows 50 and project data 52.

Project collaboration system 20, project management system 22, and domain-specific tools 70 may include, communicate with, or otherwise enable use of a variety of scientific and office applications for gathering, analyzing, and presenting project data 52. For example, domain-specific tools 70 may include measurement equipment, sensor networks, specialized databases, observational data logs, and computational/analytical models and applications to provide the domain expert with the project data 52 to complete their project workflow 50. Selected project data 52 may then be incorporated with further organization, analysis, visualization, explanation, and similar content into one or more summary presentations, reporting templates, or shared data sources using conventional word processing, spreadsheet, publishing, presentation, and other office applications. In the instance of a cross-domain project, these summary materials may contribute to a cross-domain project workflow and be generally intended for experts in other domains and cross-domain project managers and project sponsors. These materials may contain less project detail and focus on a limited number of domain-specific parameters deemed relevant to further steps in the cross-domain workflow. These materials may be shared through a variety of collaboration tools and platforms, including e-mail, web/video conferencing, and other communication tools, web-based project management platforms, shared data/application servers/networks, etc.

In some embodiments, project collaboration system 20 communicates with a cognitive log 80 and an ontology translator 90 to assist with cross-domain communication, organization, and decision-making. Project collaboration system 20 may create log entries 60 for addition to cognitive log 80, which is shared across the domain-experts and others involved in the cross-domain project. To assist the domain experts (and project generalists) in navigating cognitive log 80, ontology translator 90 provides resources for translating queries from one domain into the ontologies of other domains. Project collaboration system 20 may include an activity logger 26 and a cross-domain query 36 for interacting with cognitive log 80 and ontology translator 90.

Activity logger 26 may provide an interface between project collaboration system 20 and cognitive log 80 for creating and storing log entries 60. In some embodiments, log entries 60 may include log data and supporting project data stored on computer system 10, which may be synchronized and/or linked to cognitive log 80 and/or associated data storage. In some embodiments, log entries 60 may be stored only in cognitive log 80 or in a remote shared data repository without a data source on computer system 10. Activity logger 26 may be configured for a plurality of log entry creation options. For example activity logger 26, may include a project task 28 and a user action 30 log entry creation interfaces. Project task 28 interface may define a set of prompts and input fields for receiving domain-specific data and parameters related to progress or completion of a task or milestone that is part of the cross-domain project workflow. For example, project task 28 may include a Final Report task for receiving a final summary of the project activities completed by the domain expert in support of the cross-domain project and guide the expert user's input to assure completion and availability of all domain project data needed by others for the project. User action 30 interface may define a set of prompts and input fields for receiving domain-specific data and parameters related to the cross-domain project at the expert user's discretion as the project proceeds and/or the expert user has contributions to make to the project. For example, user action 30 may include a Test Results selection for receiving test data related to a test conducted by the domain expert, enabling the domain expert to log relevant test results as they are completed and available, regardless of whether they are defined as a specific task or milestone in the project. A variety of other project task 28 and user action 30 log creation interfaces may be available, as well as other interfaces for creating log entries. Creation of a log entry may generally include at least one domain-specific parameter prompt 32 and domain-specific shared data 34. For example, the domain-specific parameter prompt 32 may include one or more parameters that are relevant to the overall cross-domain project and/or useful to one or more other domains. In some embodiments, the domain-specific parameter prompt 32 may include the terminology and context for the parameter that is most familiar and used by experts in that domain, including but not limited to value names, units, orders of magnitude, ranges, data representation/visualization, etc. For example, if the domain experts in that field generally represent pressure maps as a two-dimensional array with specific x-y units and ranges and have specific conventions for location, baseline, and normalization, the prompts will align with those data formats and conventions. Domain-specific shared data 34 may similarly align with the accepted input formats from that domain. In some embodiments, domain specific shared data 34 may be received in the domain-specific format but then processed through a transfer function or other normalization or generalization for storage, retrieval, and use in other contexts. In some embodiments, parameter prompt 32 and shared data 34 may include a series of prompts and input fields to provide structured data for storage in log entries 60. In some embodiments, parameter prompt 32 and shared data 34 may enable the use of unstructured data input (such as unstructured text, image, audio, video, or sensor data) but with sufficient context to determine what domain-specific parameters are represented by or can be extracted from the unstructured data. In some embodiments, once a log entry is initially created based on parameter prompt 32 (such as an expert decision, report, or critical parameter value), activity logger 26 may include further prompts for supporting material (structure or unstructured data) to be uploaded as supporting or relating to the contents of the log entry.

Activity logger 26 may operate in conjunction with cognitive log 80 and ontology translator 90 to generate domain specific parameter prompt 32 and shared data 34. In some embodiments, cognitive log 80 may include a plurality of defined fields for each log entry, including domain data 82, context 84, and time stamp 86. Context 84 and time stamp 86 may be automatically generated based upon the source and time of the log entry creation and/or may be included in prompts and input fields for the expert user (particularly for users who operate across expert domains and/or the capability to pre or post-date time stamps when appropriate). Domain data 82 may include structured or unstructured data with one or more identified domain-specific parameters. In some embodiments, ontology translator 90 may assist with identifying domain-specific parameters for capture in the log entries. Ontology translator 90 includes a plurality of domain ontologies for all relevant domains involved in the cross-domain project. For example, domain 1 ontology 94 through domain n ontology 96, including relevant domain-specific parameters for each of the domains. Mapping ontology 92 defines the relationships among the plurality of ontologies, with a specific focus on domain-specific parameters that may be relevant across domains. In some embodiments, mapping ontology 92 may also include transfer functions for translating values of domain-specific parameters from one domain to another where those values are generally used in equivalent but not identical values. For example, if English units are used in one domain and metric units in another domain, the transfer function would be the conversion factor between the two units of measure, resulting in different but physically equivalent values. Similarly, in a context where power and time increments are provided as separate parameters in one domain (megawatts and hours) but used as a time-based aggregate in another (megawatt hours), the transfer function could reflect that conversion. For the purposes of activity logger 26, mapping ontology 92 may assist in identifying those domain-specific parameters from domain-specific ontology 24 (which may be generally equivalent to, for example, domain 1 ontology 94) that are relevant to the broader cross-domain project. In some embodiments, those relevant domain-specific parameters may be identified by their presence in mapping ontology 92. Parameter prompt 32 may include and require such relevant domain-specific parameters and shared data 34 may enable the data input to be compatible with translation through ontology translator 90.

Cross-domain query 36 may provide an interface between project collaboration system 20 and cognitive log 80 and ontology translator 90 for returning and displaying log entries from other domains. Cross-domain query 36 may not require the expert user from one domain to understand the ontologies of the other domains to be able to retrieve relevant data from cognitive log 80. Cross-domain query 36 may accept a domain-specific query 38 in the context and ontology of the domain expert making the query. For example, the expert user in domain 1 enters a query using the language and parameters they are familiar with in domain 1, even if the desired project data is from another domain. Domain-specific query 38 may include prompts to structure the query with specific parameters selected from the originating domain of the query (e.g., domain 1) and/or options to include parameters from other domains or mapping ontology 92. In some embodiments, domain-specific query 38 may include a free-form or natural language query prompt and input field, Boolean search logic, and/or more structured fields and/or selectable options. In some embodiments, domain-specific query 38 prompts may be structured using domain-specific ontology 24. In some embodiments, domain-specific query 38 may access ontology translator 90 to enable prompts based on a plurality of ontologies, including the ontology of the domain from which the query is originating. Domain-specific query 38 may be parsed by cross-domain query 36, ontology translator 90, or some combination thereof. Domain-specific query 38 may be parsed to identify one or more parameters for searching cognitive log 80. In some embodiments, domain specific query 38 may also be parsed for context and time information relevant to the search. In some embodiments, domain-specific query 38 may include any number of additional search parameters that may not relate directly to the ontologies of the project data. For example, cognitive log 80 may include or otherwise index additional fields for user information, project management information, organizational information, file formats, access privileges, etc. that may also be included as query criteria. Once domain-specific query 38 is parsed for parameters, those parameters may be translated using ontology translator 90 to generate a plurality of physically equivalent parameters from any number of domains. Based on the plurality of physically equivalent parameters (and any other relevant search criteria), a contextual result list 40 may be generated and displayed including each occurrence of the physically equivalent parameter within cognitive log 80 and results from across all relevant domains. In addition to the parameter search results, contextual result list 40 may include the context of each of the results returned such that the expert user can better interpret the sources and meaning of the results returned. In some embodiments, the parameters returned in contextual result list 40 will include both the domain-specific parameter from the other domain where the project data originated and its translation to the domain-specific parameter for the context from which the query originated. Contextual results list 40 may be displayed and organized according to a number of ordering and filtering algorithms, including relevance, time, project data context, etc. Log entry retrieval 42 may enable the display of the full cognitive log 80 entry for each result returned and may include the full shared project data associated with the entry. In some embodiments, log entry retrieval 42 may be provided within contextual result list 40 as practical for display on computer system 10 and the type and scope of project data and/or parameters for display.

FIG. 2 depicts an example cognitive log data structure 200 in a simple table format, such as could be used for cognitive log 80 in FIG. 1. It will be understood that a more complex data structure may be employed in some embodiments, including relational, form, linear (and n-dimensional linear), trees, hashes, graphs, linked, etc. Cognitive log data structure 200 may include a series of fields for each entry. Fields are shown as columns 210, 212, 214, 216, 218 and entries are shown as rows 220, 222, 224, 226, 228, 230, 232 in cognitive log data structure 200. Example fields shown include entry type, shared data, context domain, context parameters, and time stamp. Entry type in column 210 may reflect a plurality of log entry types that may be recorded in cognitive log data structure 200. The entry types shown are examples only and while only a single instance is shown of each type, there is no limitation of the number of log entries of each type. In some embodiments, the entry type may correlate to various input forms available through an activity logger, such as activity logger 26 in FIG. 1, and may relate to project-specific tasks and milestones or general project-related activities originating in each domain. The example activity types shown include goals (e.g., project goals, milestones, day goals, long term goals, etc.), steps (e.g., project steps, tasks, historical steps, future steps, etc. and related data such as images, text, communications, screen shots, queries, etc.), bibliography (e.g., cognitive bibliography support through databases, internal reports, and links to internal or external supporting resources), analysis (e.g., expert reports, parameters from ontology, tool & analytical software/hardware output), reporting (e.g., aggregate reporting of cognitive log activities, daily abstracts, images of new entries, project status reports, activity summaries, etc.), queries (e.g., cognitive search reports, query output images, decision-making support queries, efficiency search, etc.), and uncertainty (e.g., data-driven decisions, user interpretation/justification, quantification of certainty/risk, etc.). Each example entry also includes shared data in column 212. Each entry may include structure data, unstructured data, or a combination thereof. Though the entries shown provide only the data type (structured or unstructured), each entry may also include a link to the project data source or an extracted copy of the relevant data supporting the entry. Context domain in column 214 may show the source domain for each entry. For example, if there are 3 domains, data originating from project data in domain 1 would indicate domain 1 as context domain, data originating from project data in domain 2 would indicate domain 2 as context domain, and so on. Additional contexts may also be possible, such as a general project management or cross-domain context or one or more external contexts. Context parameters in column 216 may include one or more domain-specific parameters. For example, the project data (or an abstraction, calculation, or summary of that data) that is specifically tied to the domain-specific-ontology and has one or more relationships to the mapping ontology and other domain ontologies. The context parameters may be used as a primary index for searching cognitive log data structure 200. Time stamp in column 218 may provide a time-based record for ordering items in the cognitive log and/or searching and displaying results based on time line. For example, each entry may include the time the entry was logged. It will be understood that any number of additional fields may be included, including fields for assisting with data relationships such as key values and link references.

Figure 3:
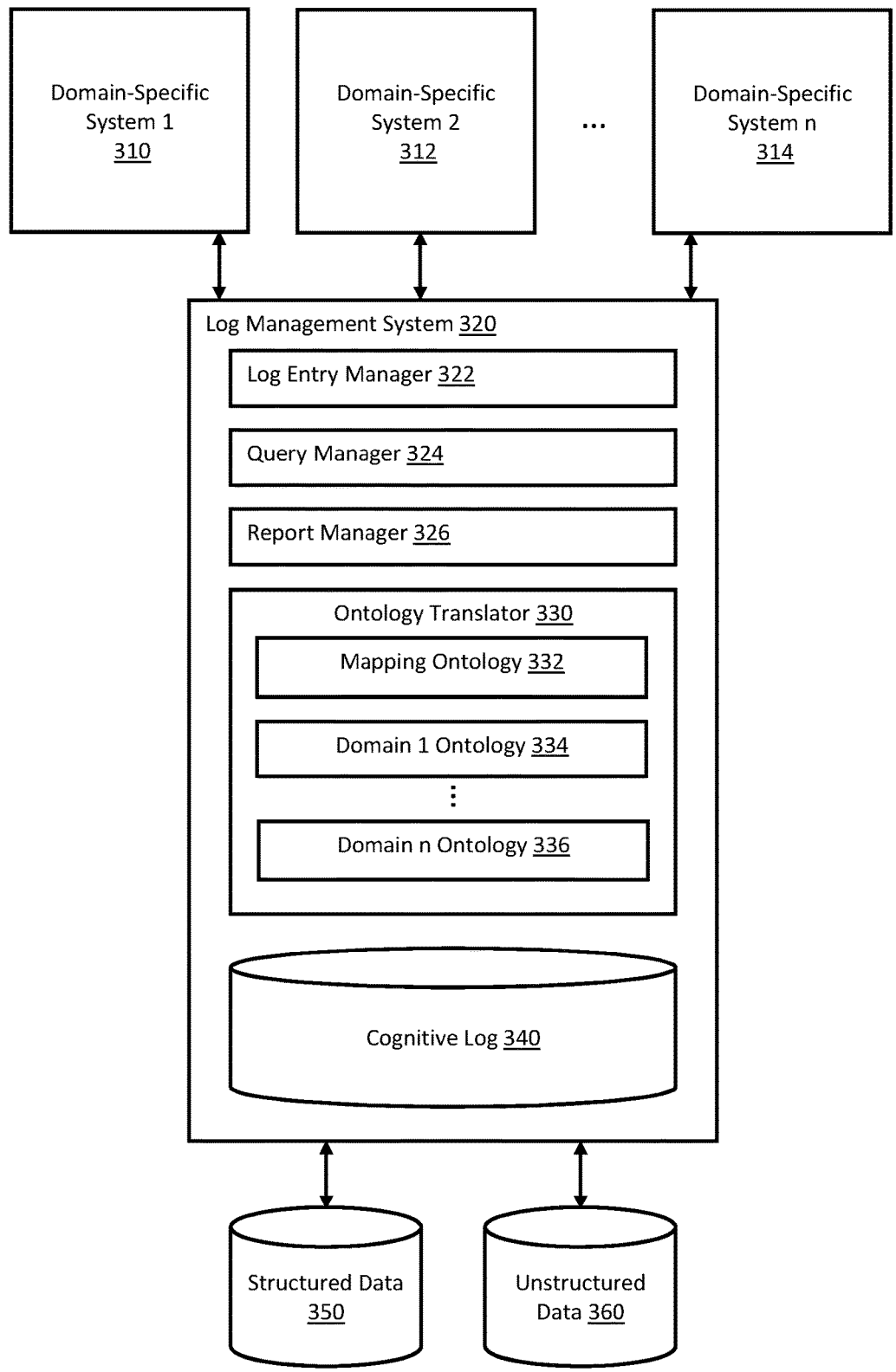
FIG. 3 shows an example log management system according to embodiments.

FIG. 3 depicts example network computing environment 300 including an example log management system 320 supporting a plurality of domain-specific systems 1-*n* 310, 312, 314. Domain-specific systems 1-*n* 310, 312, 314 may be computer systems incorporating project collaboration systems, such as computing system 10 in FIG. 1. Log management system 320 may be a separate computing system, such as a remote server system, for providing log management functions and data repositories to support cross-domain projects using domain-specific systems 1-*n* 310, 312, 314. In some embodiments, some or all of log management system 320 may be hosted on one of domain-specific systems 1-*n* 310, 312, 314 or distributed among them in components or as redundantly synchronized copies.

Log management system 320 includes a log entry manager 322, a query manager 324, and a report manager 326. Log entry manager 322 receives log entries for cognitive log 340 from domain-specific systems 1-*n* 310, 312, 314. In some embodiments, log entry manager 322 works in communication with activity loggers in domain-specific systems 1-*n* 310, 312, 314 to structure parameter prompts and project data received from those systems for storage in log entries. In some embodiments, log entry manager 322 may complete log entry fields not provided by the activity loggers, such as domain context and time stamps. Log entry manager 322 may structure and validate project data from domain-specific systems 1-*n* 310, 312, 314 to comply with shared data access and searchable data with cognitive log 340. Query manager 324 receives domain-specific queries to cognitive log 340 from domain-specific systems 1-*n* 310, 312, 314. In some embodiments, query manager 324 works in communication with cross-domain queries from domain-specific systems 1-*n* 310, 312, 314 to structure domain-specific queries in such a way that they can be parsed and run against cognitive log 340. For example, query manager 324 may use ontology translator 330 to identify domain-specific parameters present in the domain-specific query and translate those parameters into physically equivalent parameters that may be found in other domains. In some embodiments, query manager 324 may structure and validate domain-specific queries from domain-specific systems 1-*n* 310, 312, 314 to comply with the ontologies available in ontology translator 330 and searchable within cognitive log 340. Report manager 326 enables the creation of aggregate reports from cognitive log 340 to support cross-domain project management. For example, report manager 326 may generate summaries of goals, steps, bibliography, analysis, queries, and uncertainty log entries, as well as various forms of reporting, such as aggregate reporting of cognitive log activities, daily abstracts, images of new entries, project status reports, activity summaries, etc. In some embodiments, report manager 326 operates in conjunction with a cross-domain project management application to provide summary data to support project reporting and decision-making.

Ontology translator 330 may operate substantially as described above for ontology translator 90 in FIG. 1, providing a plurality of domain 1-*n* ontologies 334, 336 and a mapping ontology 332. Domain-specific and mapping ontologies will be described in further detail below with regard to FIGS. 6-7. Cognitive log 340 may operate substantially as described above for cognitive log 80 in FIG. 1 and cognitive log data structure 200 in FIG. 2. In the example shown, cognitive log 340 is linked to one or more external data repositories from storing, indexing, and retrieving project data related to log entries. Cognitive log 340 may include log entries linked to structured data 350 and unstructured data 360. For example, structured data 350 may be a database structure including a plurality of tables for structured project data linked to one or more entries in cognitive log 340. In some embodiments, structured data 350 may be integrated into the same database as cognitive log 340. Unstructured data 360 may support a variety of file formats for text, image, audio, video, sensor, calculated, and similar data. These unstructured data files may be linked to entries in cognitive log 240, structured data 350, and/or metadata to enable retrieval of relevant unstructured data in response to queries against cognitive log 240.

Figure 4:
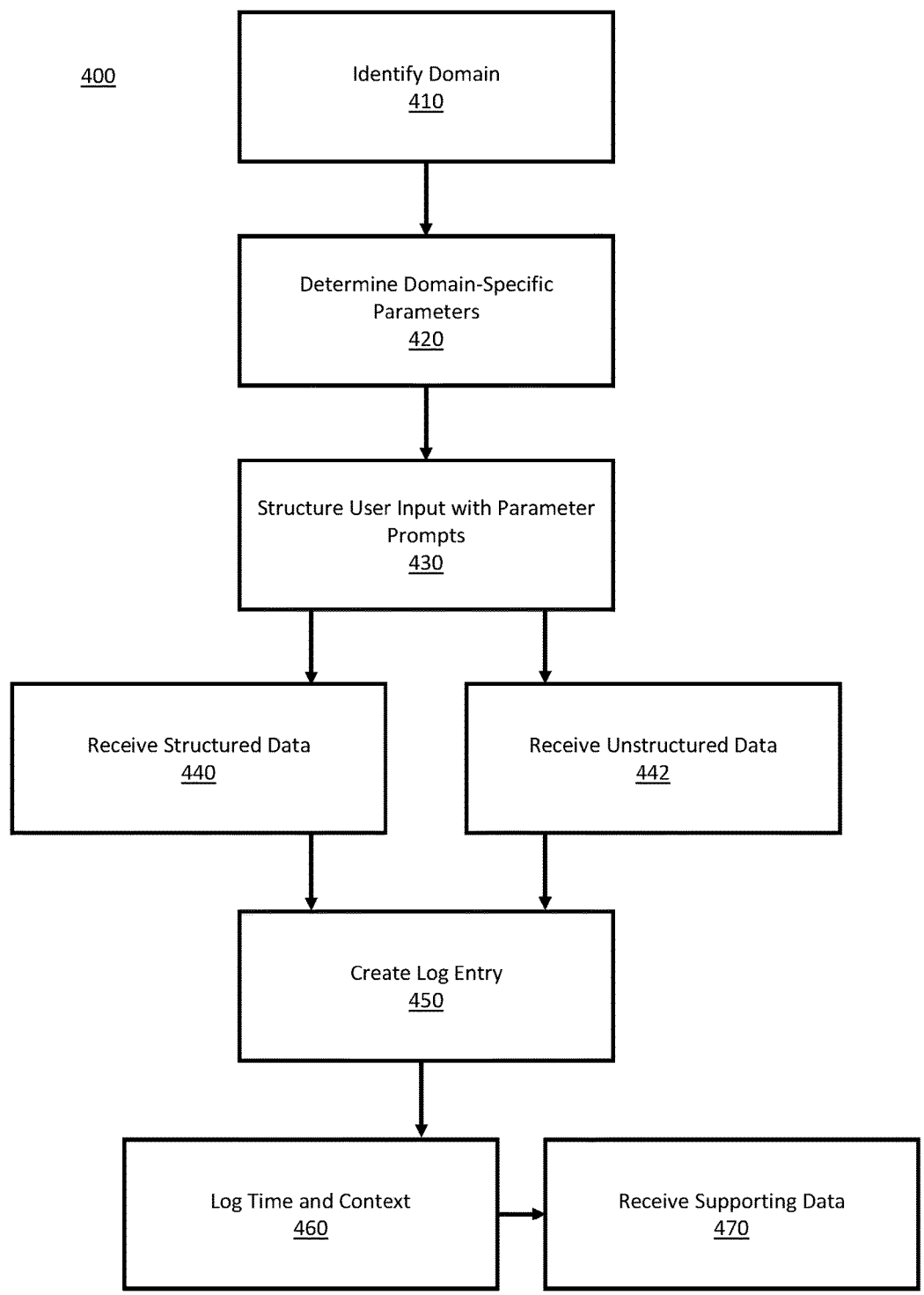
FIG. 4 shows an example method of logging project activities according to embodiments.

FIG. 4 depicts an example method 400 of logging project activities using a project collaboration system, such as project collaboration system 20 in FIG. 1. Method 400 may be executed in the context of a domain-specific interface hosted on a computing system and providing access to a shared log management system and cross-domain project data. In step 410, a domain is identified for the expert user logging a new user activity. For example, the expert user may select a domain from a list of domain ontologies supported by the system or the system may identify a domain based on the user or domain-specific system originating the log entry. In step 420, one or more domain-specific parameters are determined. For example, the log management system may provide a list of domain-specific parameters identified in a domain-specific ontology and related to parameters in other domains through a mapping ontology. In step 430, user input is structured with parameter prompts though the domain-specific interface. For example, based on the domain identified in step 410, user input prompts may include prompts for the user to enter selected domain-specific parameters for a given activity (such as a system or user selected task, milestone, analysis, etc.) or may provide more general prompts and validate the user entered or selected project data to ensure that the relevant domain-specific parameters are present and identifiable. In steps 440 and 442, structured and/or unstructured data is received from the user. For example, the user may enter specific data in response to prompts for specific parameters, select one or more files, or some combination thereof that enables the system to identify the domain-specific parameters present in the received data. In step 450, a log entry is created in the shared cognitive log with the received project data and the identified domain-specific parameters. For example, a new entry may be created in a data table associated with the cognitive log to include entry type, project data, and domain-parameters. In step 460, the time and context of the log entry is logged in the log entry. For example, the system adds a context domain based on the domain selected in step 410 and a time stamp based on when the log was created in step 450. In some embodiments, further processing and indexing of the log entry and associated project data may also be completed to support future queries against the log entry. In step 470, the user may also be prompted or otherwise have the opportunity to upload additional supporting material related to the log entry and the supporting data is received and linked to the log entry. For example, once the requirements are met for a complete log entry, the user may be prompted for general or specific supporting materials related to the log entry. In some embodiments, the prompt for supporting material may run at a set interval after log creation or on a recurring basis to encourage user supplementation of decision support data that may be helpful to other expert users.

Figure 5:
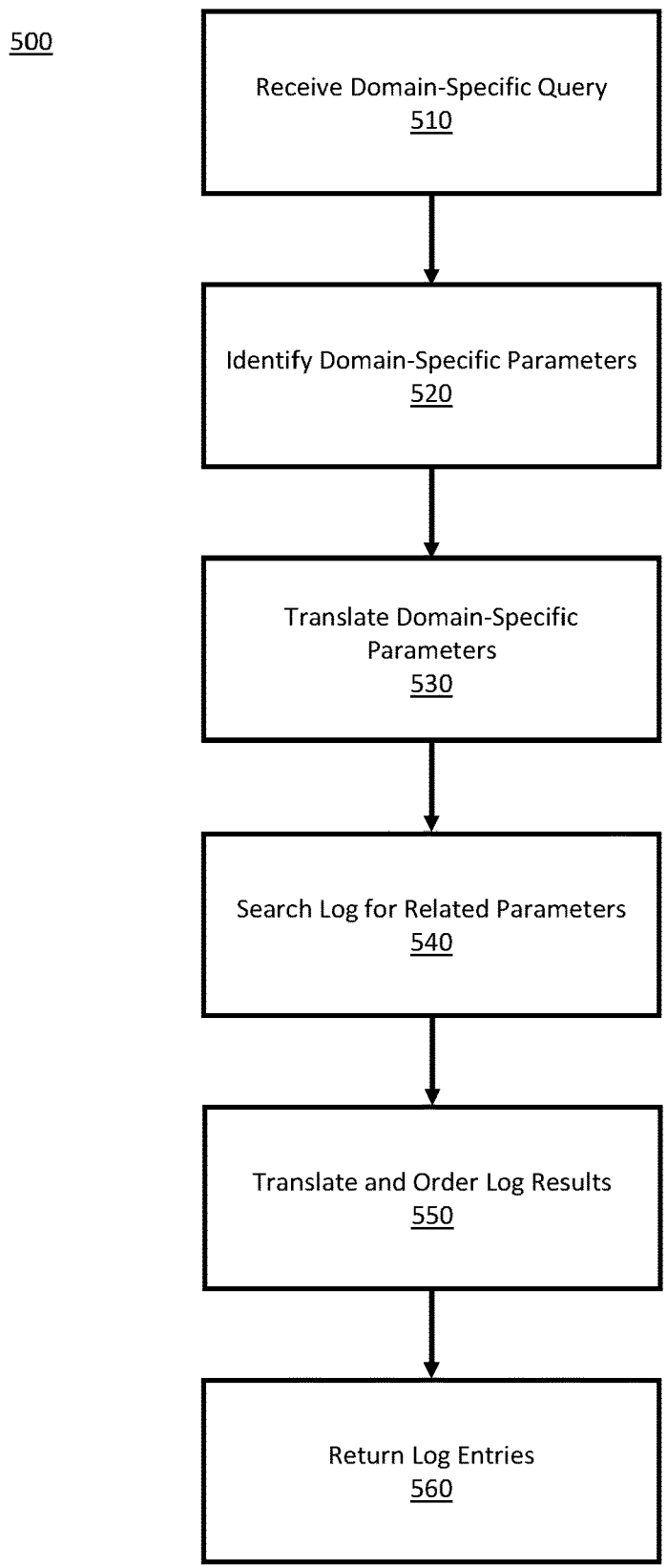
FIG. 5 shows an example method of processing a domain-specific query according to embodiments.

FIG. 5 depicts an example method 500 of processing a domain-specific query using a project collaboration system, such as project collaboration system 20 in FIG. 1. Method 500 may be executed in the context of a domain-specific interface hosted on a computing system and providing access to a shared log management system and cross-domain project data. In step 510, a domain-specific query is received from a user based on a domain-specific ontology. For example, a domain expert uses the domain-specific interface to input a query including domain-specific parameters relevant to the domain expert's domain, while looking for results from across all domains involved in the cross-domain project. In step 520, domain-specific parameters are identified in the query input. For example, the query interface may specifically prompt for domain-specific parameters or may parse the input to identify any domain-specific parameters therein (with or without user validation of the identified parameters) based on the user's domain. In step 530, domain-specific parameters are translated into a list of physically equivalent but not identical parameters for any other domain in which those parameters appear. For example, a mapping ontology may be used to compare the input domain-specific parameter(s) against parameters from other domains that have a relationship according to the mapping ontology. In step 540, the cognitive log is searched for both the domain-specific parameter and all related parameters from other domains. For example, if step 530 identified 3 equivalent parameters in two different domains, both the original parameter and 3 equivalent parameters would be searched and optionally validated against the expected context domain. In step 550, the log search results would be translated and ordered for delivery and display to the user. For example, the search results would include both the parameter value retrieved in the search, the domain context of that parameter value, and, if a translation function is defined in the mapping ontology, a translation of the parameter value to the domain ontology from which the query originated. In step 550, the log entries are returned to the user who submitted the query. For example, the domain-specific interface would return and display an ordered list with original and translated parameters, context domain, and time stamp, as well as including or linked to the relevant shared project data.

Figure 6:
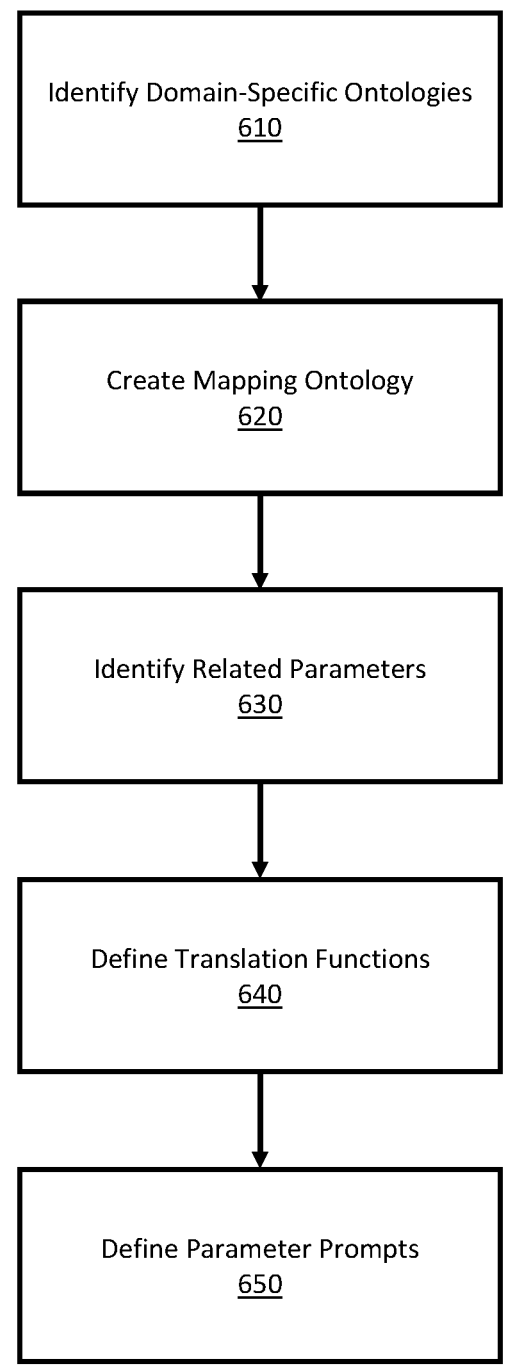
FIG. 6 shows an example method of developing of an ontology translator according to embodiments.

FIG. 6 depicts an example method 600 of developing of an ontology translator for use with a project collaboration system, such as project collaboration system 20 in FIG. 1. Method 600 may be executed in the context of a shared log management system and cross-domain project data. As an example, the steps below will be explained with regard to analysis of an oil reservoir. In step 610, a plurality of domain specific ontologies are identified. For example, oil reservoir analysis involved three specific geological disciplines or domains: (domain 1) geophysics, where seismic interpreters analyze seismic data to provide geological layers separation in the underground; (domain 2) geological modeling, where geologists build 3D models to represent layers and associated properties (e.g. permeability) to these layers; and (domain 3) flow simulation, where reservoir engineers simulate scenarios of the reservoir (e.g., where to drill wells, forecast production, etc.). In step 620, a mapping ontology is created. For example, the three domain ontologies all relate to a common ontology, based on a basic geologic ontology, which can be used to define specific relationships among the domains. More specifically, these ontologies each include a variety of parameters defining specific types of data sets, quantifications and representations of those data sets, and analytical interpretations of those quantifications and representations. In step 630, related parameters are identified across domains using the common ontology. For example, the same class of geological object or physical phenomena may exist in all three ontologies, though under slightly different names and quantified or described in different ways. The mapping ontology may identify these relationships as subclasses of the same geological object and specific parameter values as instances of those subclasses. Each of these subclasses may have distinct parameter names, types, ranges, and units, as well as relationships and functions within the specific domain ontology and related domain workflows that are distinct from the parameters of the related subclass in each of the other domains. In step 640, translation functions are defined. For example, because the related subclasses in the different domains are related through the class in the mapping ontology and assuming they can be traced to a common instance of a physical phenomenon in the course of a given project (e.g., by location, time, or other project parameters), the parameters describing that instance in any given domain may have relevance to the project workflows and analysis being conducted in the other domains. However, because the parameters of the subclasses are drawn from specific domain ontologies, they may not be identical to the related parameters expressed in the other domain. A simple example of this is a difference in units of measure, but more complex yet quantifiable relationships are also possible. In order to be able to provide data in a form that is most useful in the other domain, translation functions can be defined for each relationship across domains for translating the parameter values in one domain to physically equivalent (i.e., describing the same physical phenomena) but not identical values in the other domain (e.g., 0 Celsius is equivalent to 32 Fahrenheit, but 0 is not identical to 32). In step 650, parameter prompts are defined to align project data received from expert users in each of the domains with domain-specific parameters that map through the mapping ontology to the other domains. For example, a domain-specific user interface for receiving project data for the cognitive log would request specific minimum information needed to be in compliance with specific norms of the cross-domain project. This minimum information needed would be reflected in specific prompts to elicit parameterized data of interest, such as "Are there indications of spatial variability in impedance geology?", "Are there indications of faults?", "Are there uncertainties for parameter estimation, how much?" and "Can the supporting data be provided as an image?" User answers to each of these questions can be made subclass parameters describing a specific geological data set within the context of that domain and also treat them as an instance of a geological object defined in the mapping ontology and connected to related subclasses in other domains.

It is understood that project collaboration system 20 may be implemented as a computer program product stored on a computer readable storage medium.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as JAVA, PYTHON, Smalltalk, C++or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 16, an input/output (I/O) 14 (e.g., one or more I/O interfaces and/or devices), and a communications pathway 18. In general, processor(s) 12 execute program code which is at least partially fixed in memory 16. While executing program code, processor(s) 12 can process data, which can result in reading and/or writing transformed data from/to memory and/or I/O 14 for further processing. The pathway 18 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the project collaboration system 20 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A project collaboration system, comprising:
a cognitive log that stores a plurality of log entries based on a plurality of domain-specific project data sources and provided by domain-specific systems;
an ontology translator comprising a plurality of domain-specific ontologies corresponding to the plurality of domain-specific project data sources and a mapping ontology that defines a plurality of relationships among the plurality of domain specific ontologies, wherein the mapping ontology comprises a plurality of domain-specific parameters from the plurality of domain-specific ontologies, a plurality of defined relationships among the plurality of domain-specific parameters, and a plurality of translation functions for converting values of domain-specific parameters from a first domain to an equivalent but not identical value of a domain-specific parameter from a second domain;
a computer system in communication with the cognitive log and ontology translator and providing a cross-domain query function based on a first domain-specific ontology, whereby a user query submitted through the computer system includes at least one first domain parameter from the first domain-specific ontology that is translated into at least one equivalent but not identical second domain parameter from a second domain-specific ontology by the ontology translator, wherein the computer system includes a log managment system comprising,
a log entry manager configured to receive the log entries for the cognitive log from the domain-specific systems and complete unprovided log entry fields,
a query manager configured to receive domain-specific queries for the cognitive log from the domain-specific systems and structure the domain-specific queries to be compatible with the cognitive log, and
a report manager configured to create aggregate reports from the cognitive log to support a cross-domain project management;
an activity logger that creates log entries in the cognitive log including at least one first domain parameter from the first domain specific ontology and a context value corresponding to the first domain specific ontology, the activity logger further configured to provide a plurality of log entry creation options defining a set of prompts and input fields for receiving the domain-specific data and parameters related to progress and completion of a task that is part of a cross-domain project workflow, the set of prompts including terminology and context for the parameter relating to a domain-specific expert, the log entry creation options include a project task interface configured to receive a final summary of project activities completed in support of the cross-domain project;

summary materials incorporating the first domain-specific ontology translated into the second domain-specific ontology, wherein the summary materials include an analysis, an explanation, and a visualization of the translation; and whereby query results are returned and output on the computer system from the plurality of log entries in the cognitive log containing the second domain parameter.

2. The project collaboration system of claim 1, wherein the plurality of log entries each include a context value corresponding to at least one of the plurality of domain-specific ontologies and the query results are organized for output based on the context value.

3. The project collaboration system of claim 1, wherein the activity logger includes a parameter prompt for the at least one first domain parameter and the mapping ontology includes the at least one first domain parameter and a relationship between the at least one first domain parameter and at least one equivalent but not identical second domain parameter from a second domain-specific ontology.

4. The project collaboration system of claim 1, wherein the plurality of log entries in the cognitive log each include a time stamp and whereby the query results are organized for output based on time stamps.

5. The project collaboration system of claim 1, wherein the plurality of log entries include project data from the plurality domain-specific project data sources, the project data including structured data and unstructured data.

6. A computer program product stored on a computer readable storage medium, which when executed by a computing system, provides a project collaboration system, the program product comprising:
program code that accesses a cognitive log that stores a plurality of log entries based on a plurality domain-specific project data sources provided by domain-specific systems;
program code that accesses an ontology translator comprising a plurality of domain-specific ontologies corresponding to the plurality of domain-specific project data sources and a mapping ontology that defines a plurality of relationships among the plurality of domain specific ontologies, wherein the mapping ontology comprises a plurality of domain-specific parameters from the plurality of domain-specific ontologies, a plurality of defined relationships among the plurality of domain-specific parameters, and a plurality of translation functions for converting values of domain-specific parameters from a first domain to an equivalent but not identical value of a domain-specific parameter from a second domain;
program code that provides a cross-domain query function based on a first domain-specific ontology, whereby a user query submitted through the computer system includes at least one first domain parameter from the first domain-specific ontology that is translated into at least one equivalent but not identical second domain parameter from a second domain-specific ontology by the ontology translator, wherein the computer system includes a log management system comprising:
a log entry manager configured to receive the log entries for the cognitive log from the domain-specific systems and complete unprovided log entry fields,
a query manager configured to receive domain-specific queries for the cognitive log from the domain-specific systems and structure the domain-specific queries to be compatible with the cognitive log, and a report manager configured to create aggregate reports from the cognitive log to support a cross-domain project management;
program code that provides an activity logger that creates log entries in the cognitive log including at least one first domain parameter from the first domain specific ontology and a context value corresponding to the first domain specific ontology, the activity logger further configured to provide a plurality of log entry creation options defining a set of prompts and input fields for receiving the domain-specific data and parameters related to progress and completion of a task that is part of a cross-domain project workflow, the set of prompts including terminology and context for the parameters relating to a domain-specific expert, the log entry creation options include a project task interface configured to receive a final summary of project activities completed in support of the cross-domain project;
program code that provides summary materials incorporating the first domain-specific ontology translated into the second domain-specific ontology, wherein the summary materials include an analysis, an explanation, and a visualization of the translation; and
program code that returns and displays query results on the computer system from the plurality of log entries in the cognitive log containing the second domain parameter.

7. The computer program product of claim 6, wherein the plurality of log entries each include a context value corresponding to at least one of the plurality of domain-specific ontologies and the query results are organized for output based on the context value.

8. The computer program product of claim 6, wherein the activity logger includes a parameter prompt for the at least one first domain parameter and the mapping ontology includes the at least one first domain parameter and a relationship between the at least one first domain parameter and at least one equivalent but not identical second domain parameter from a second domain-specific ontology.

9. The computer program product of claim 6, wherein the plurality of log entries in the cognitive log each include a time stamp and whereby the query results are organized for output based on time stamps.

10. The computer program product of claim 6, wherein the plurality of log entries include project data from the plurality domain-specific project data sources, the project data including structured data and unstructured data.

11. A computerized method comprising:
accessing a cognitive log that stores a plurality of log entries based on a plurality of domain-specific project data sources and provided by domain-specific systems;
accessing an ontology translator comprising a plurality of domain-specific ontologies corresponding to the plurality of domain-specific project data sources and a mapping ontology that defines a plurality of relationships among the plurality of domain specific ontologies, wherein the mapping ontology comprises a plurality of domain-specific parameters from the plurality of domain-specific ontologies, a plurality of defined relationships among the plurality of domain-specific parameters, and a plurality of translation functions for converting values of domain-specific parameters from a first domain to an equivalent but not identical value of a domain-specific parameter from a second domain;
receiving a cross-domain query based on a first domain-specific ontology, whereby a user query submitted through a computer system includes at least one first domain parameter from the first domain-specific ontology that is translated into at least one equivalent but not identical second domain parameter from a second domain-specific ontology by the ontology translator, wherein the computer system includes a log management system comprising:

a log entry manager configured to receive the log entries for the cognitive log from the domain-specific systems and complete unprovided log entry fields, a query manager configured to receive domain-specific queries for the cognitive log from the domain-specific systems and structure the domain-specific queries to be compatible with the cognitive log, and a report manager configured to create aggregate reports from the cognitive log to support a cross-domain project management;

providing an activity logger that creates log entries in the cognitive log including at least one first domain parameter from the first domain specific ontology and a context value corresponding to the first domain specific ontology, the activity logger further configured to provide a plurality of log entry creation options defining a set of prompts and input fields for receiving the domain-specific data and parameters related to progress and completion of a task that is part of a cross-domain project workflow, the set of prompts including terminology and context for the parameters relating to a domain-specific expert, the log entry creation options include a project task interface configured to receive a final summary of project activities completed in support of the cross-domain project;

providing summary materials incorporating the first domain-specific ontology translated into the second domain-specific ontology, wherein the summary materials include an analysis, an explanation, and a visualization of the translation; and returning and displaying query results on the computer system from the plurality of log entries in the cognitive log containing the second domain parameter.

12. The computerized method of claim 11, wherein the plurality of log entries each include a context value corresponding to at least one of the plurality of domain-specific ontologies and the query results are organized for output based on the context value.

13. The computerized method of claim 11, wherein the activity logger includes a parameter prompt for the at least one first domain parameter and the mapping ontology includes the at least one first domain parameter and a relationship between the at least one first domain parameter and at least one equivalent but not identical second domain parameter from a second domain-specific ontology.

14. The computerized method of claim 11, wherein the plurality of log entries in the cognitive log each include a time stamp and whereby the query results are organized for output based on time stamps.

* * * * *